May 21, 1957  H. EDEL  2,792,680
MILK FILLER APPARATUS
Filed Dec. 10, 1953  7 Sheets-Sheet 4
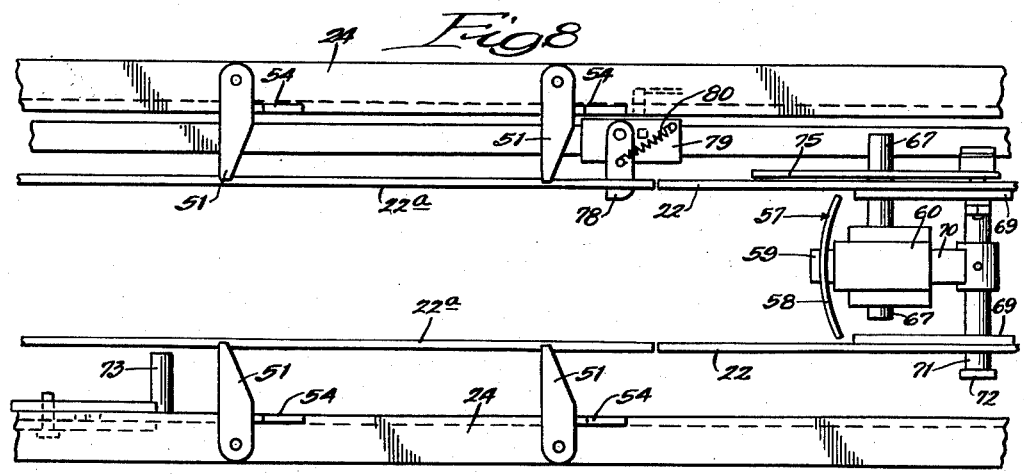
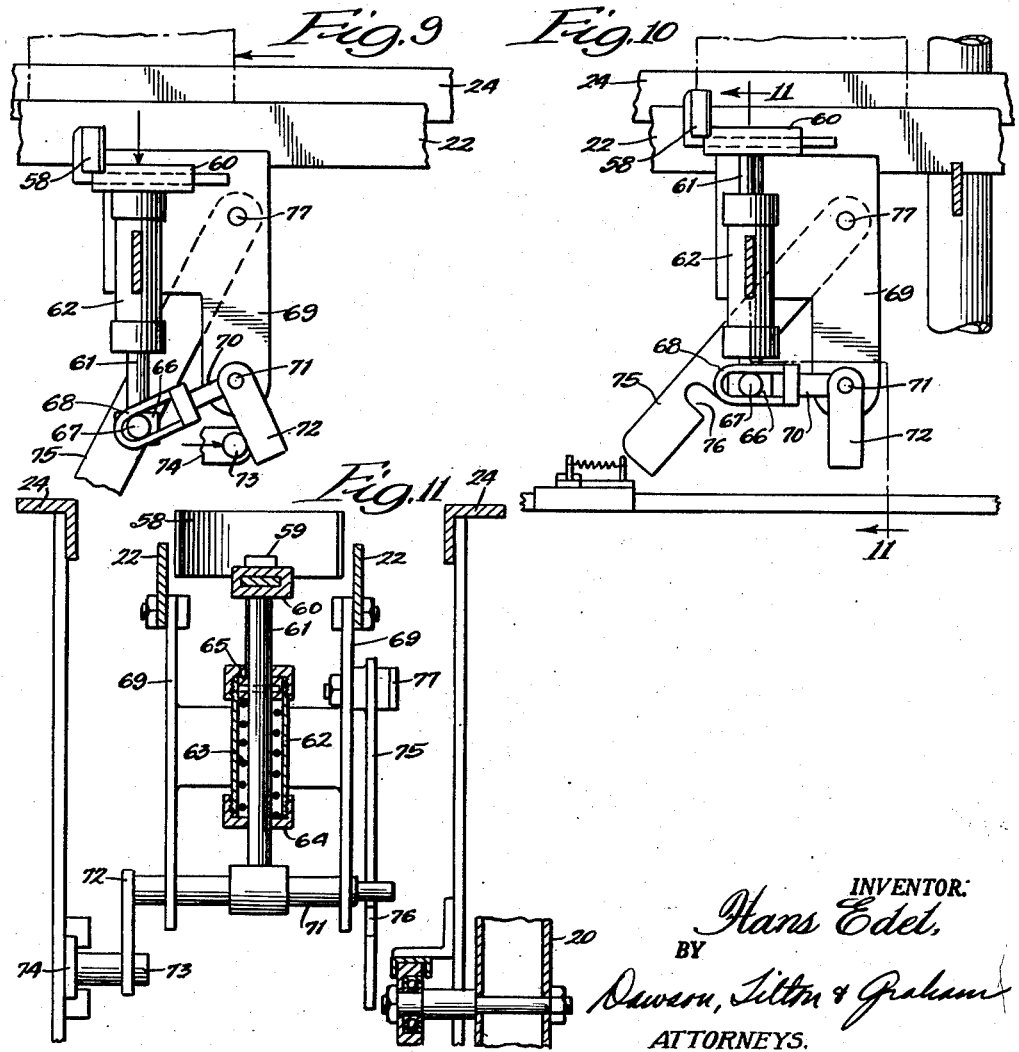
INVENTOR:
Hans Edel,
BY
Dawson, Tilton & Graham
ATTORNEYS.

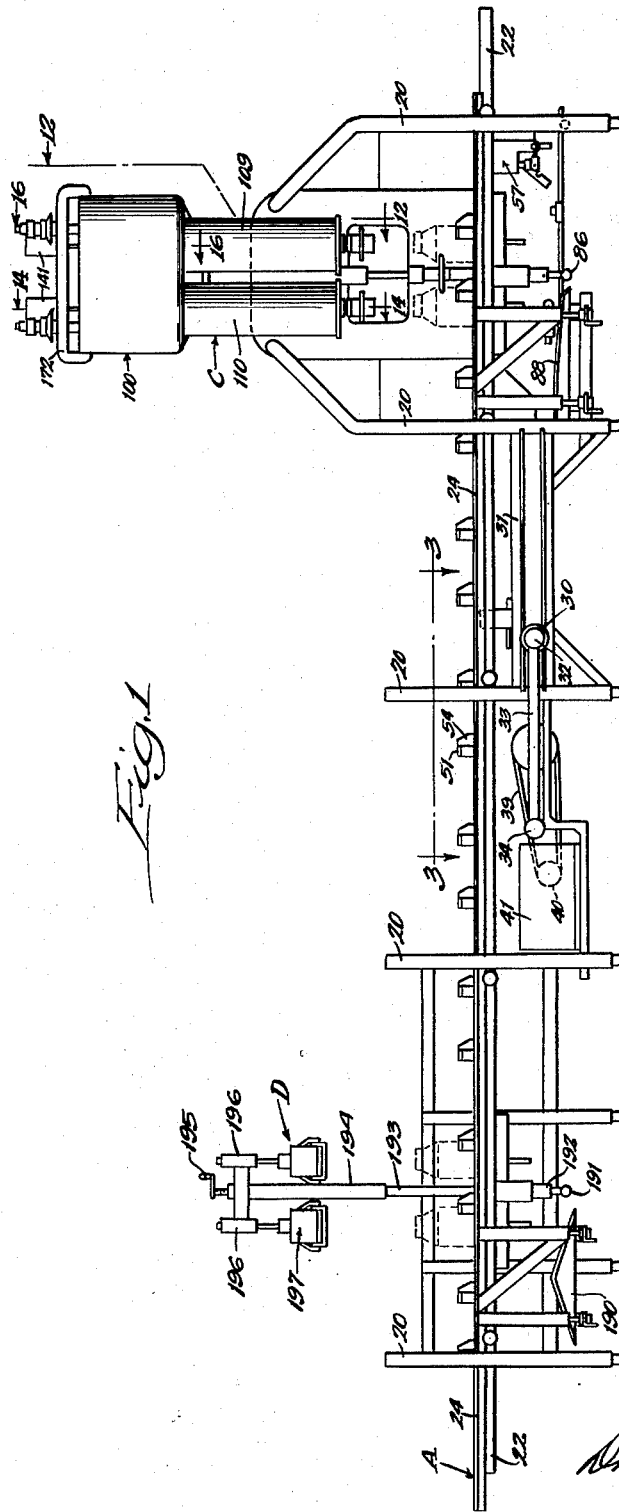

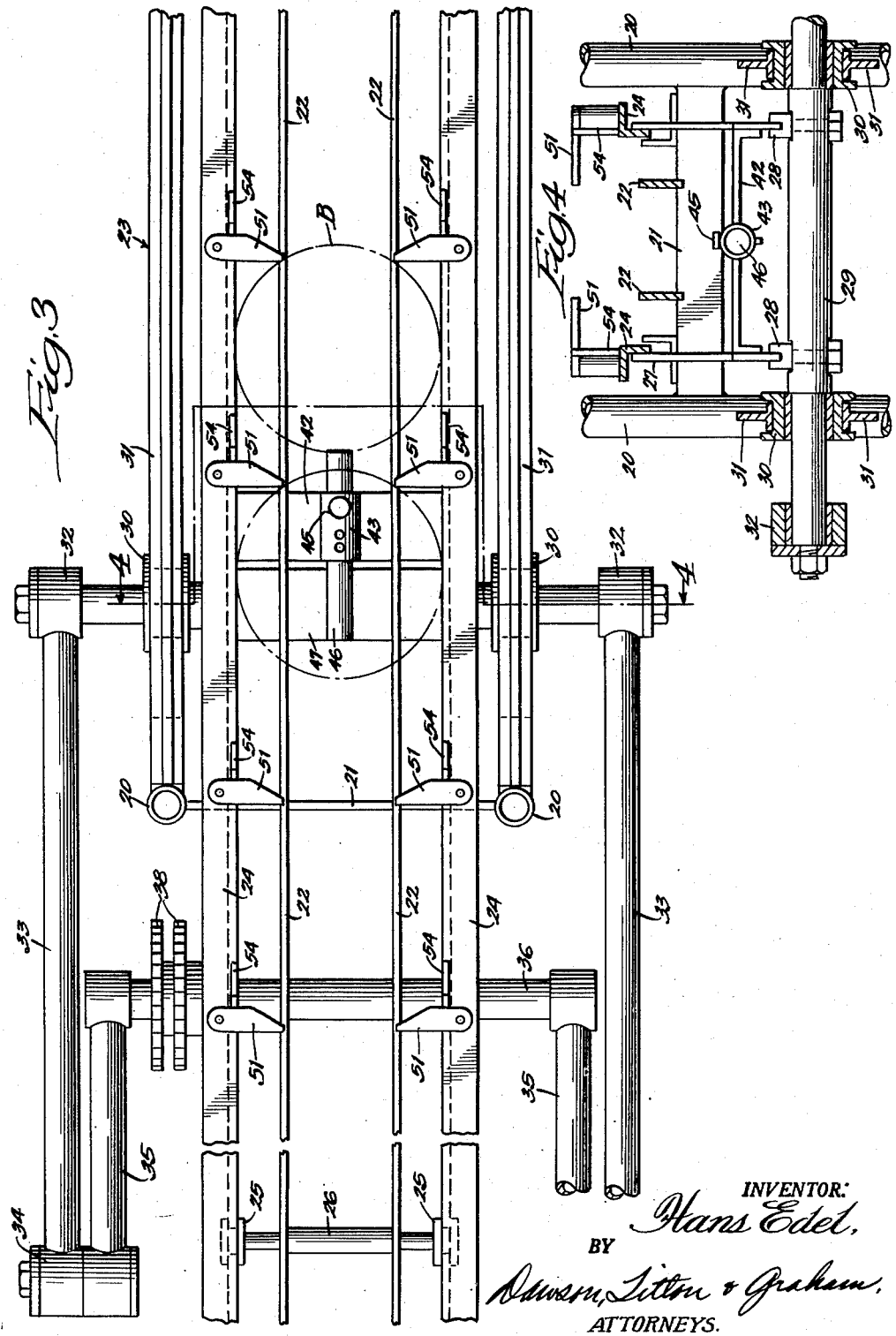

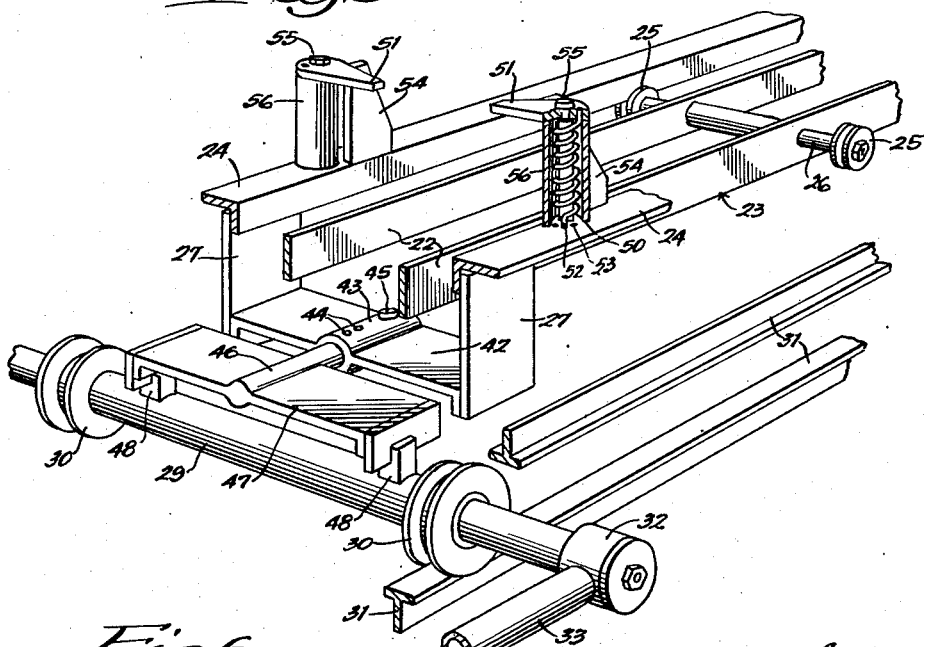
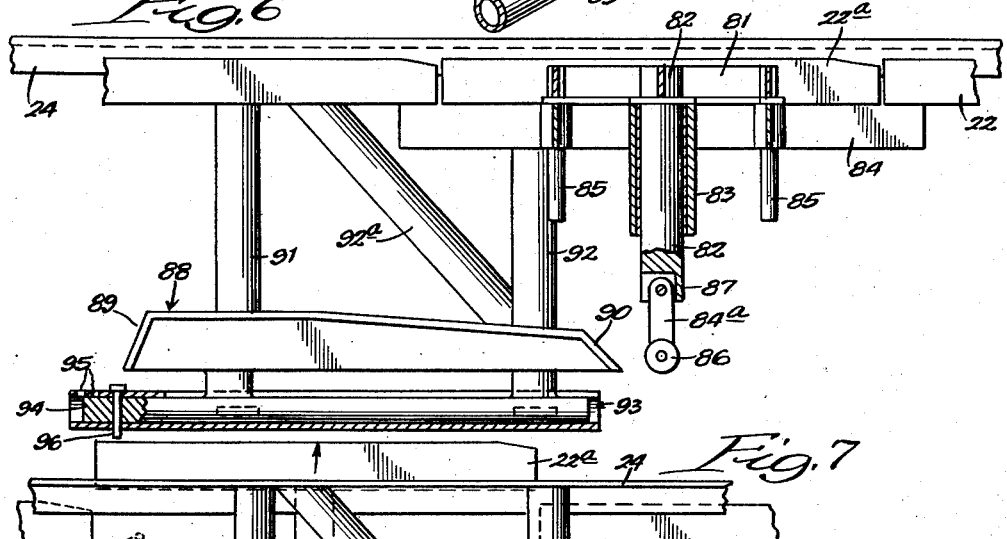

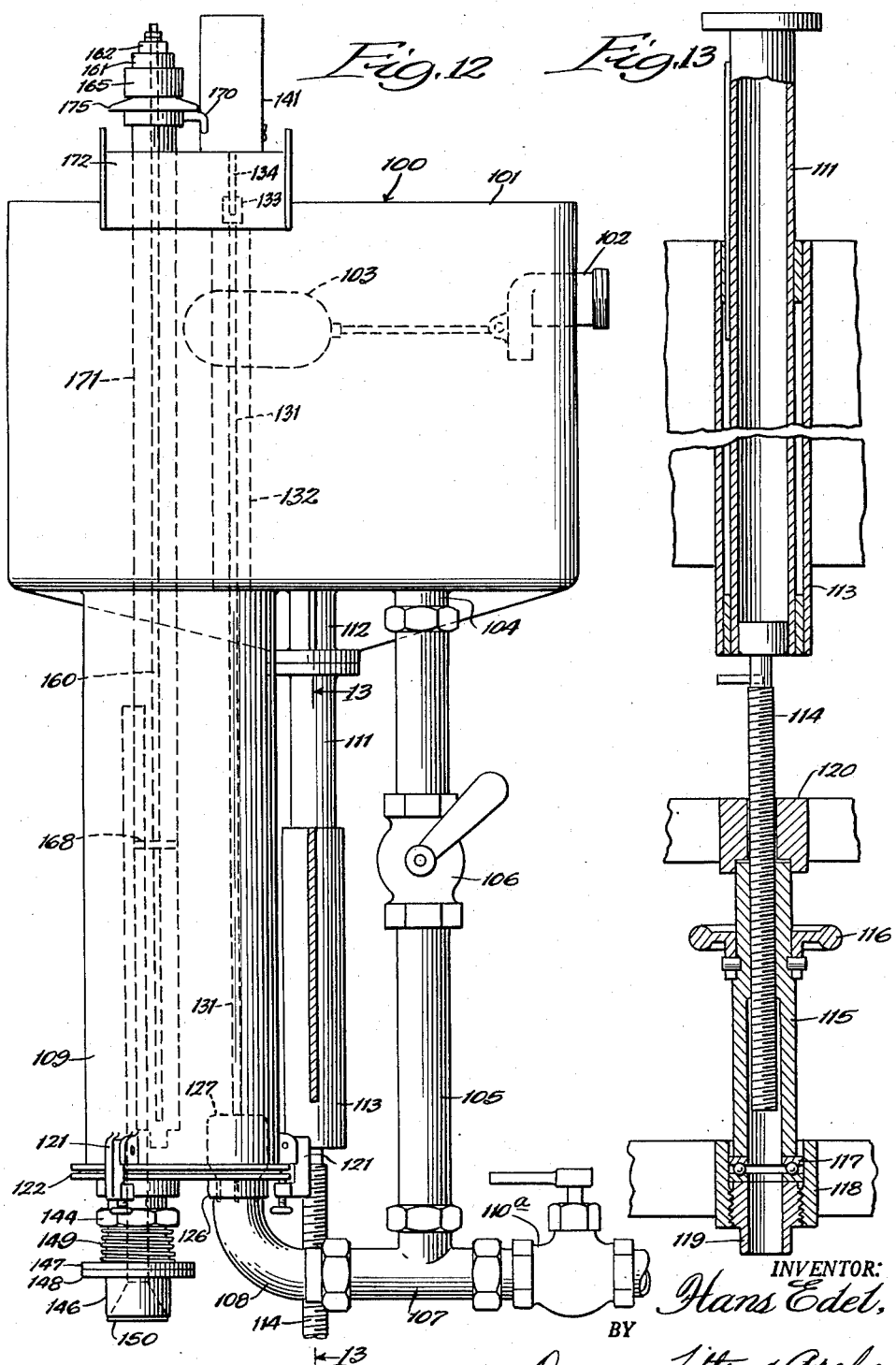

May 21, 1957 H. EDEL 2,792,680
MILK FILLER APPARATUS
Filed Dec. 10, 1953 7 Sheets-Sheet 6
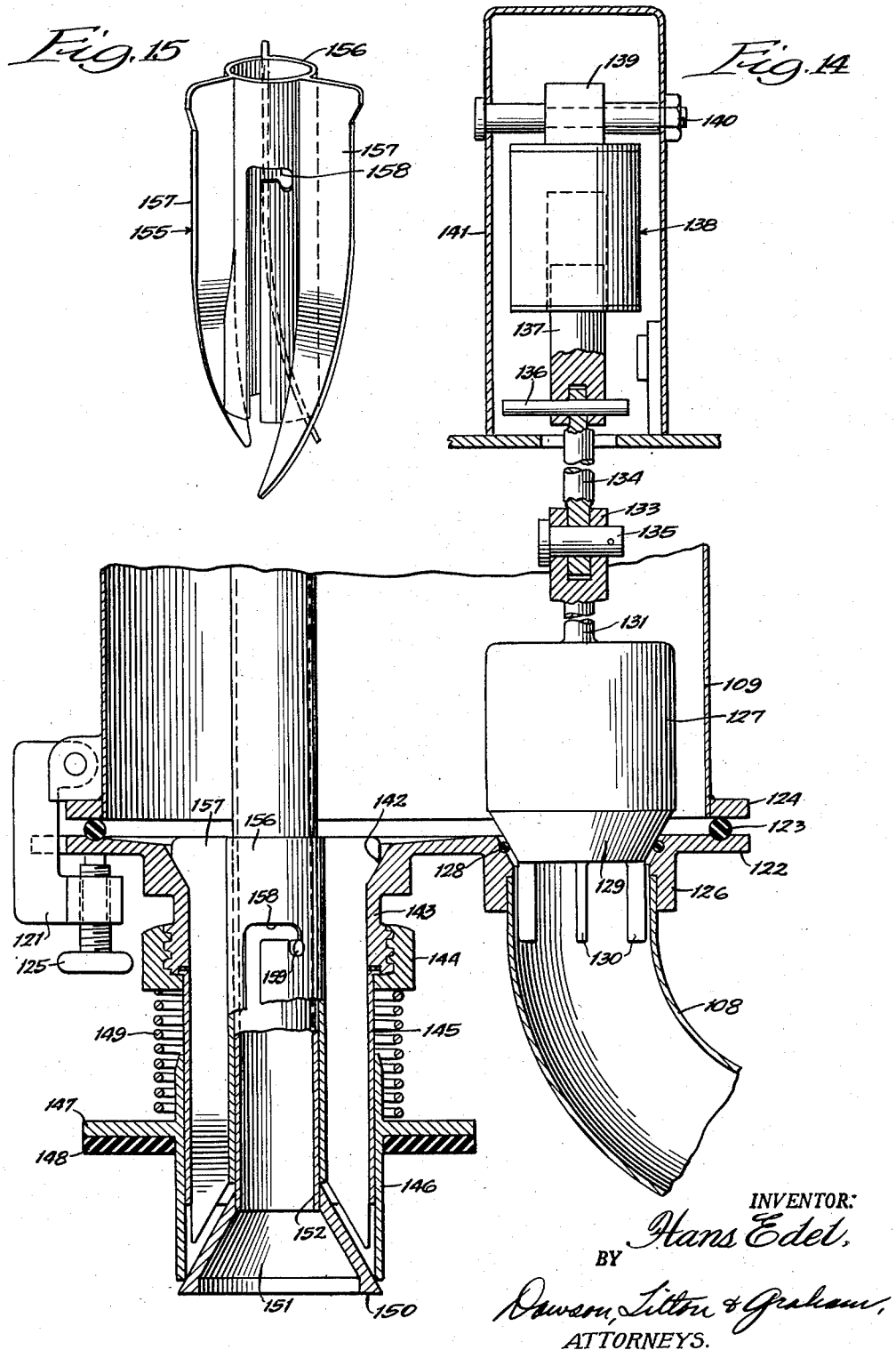
INVENTOR:
Hans Edel,
BY
Dawson, Tilton & Graham,
ATTORNEYS.

May 21, 1957 H. EDEL 2,792,680
MILK FILLER APPARATUS
Filed Dec. 10, 1953 7 Sheets-Sheet 7
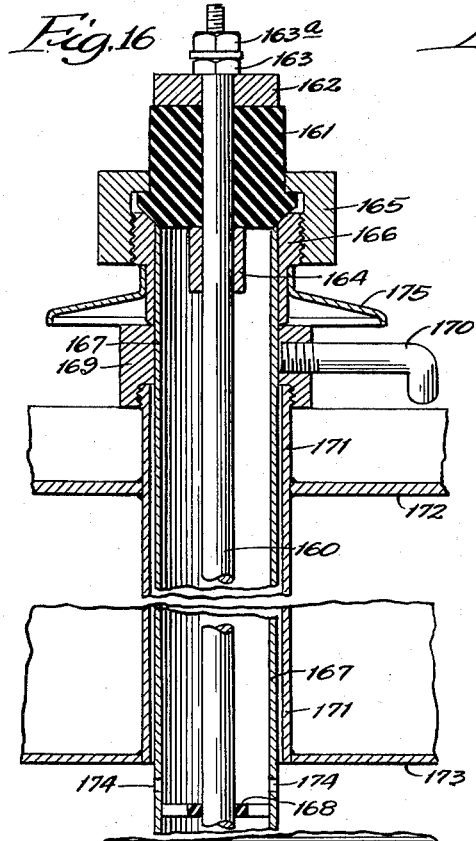
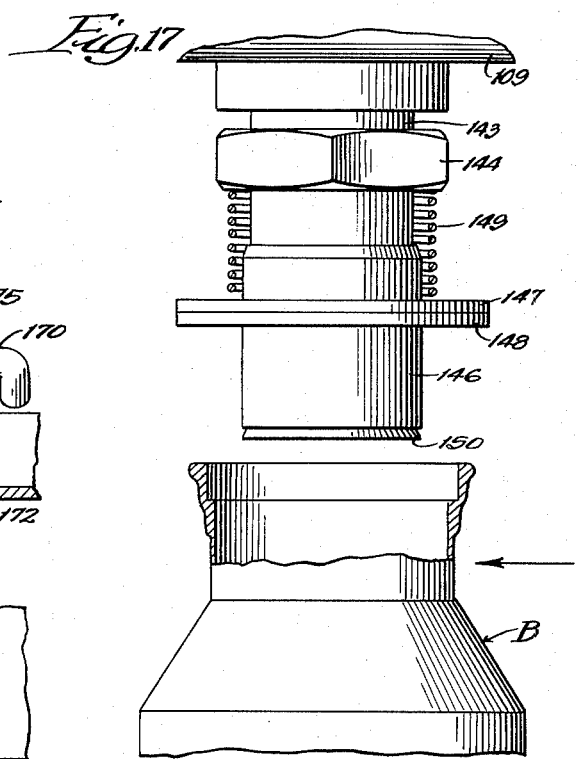
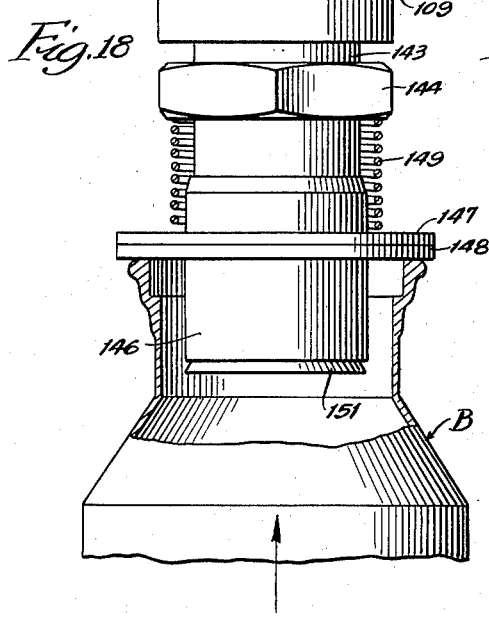
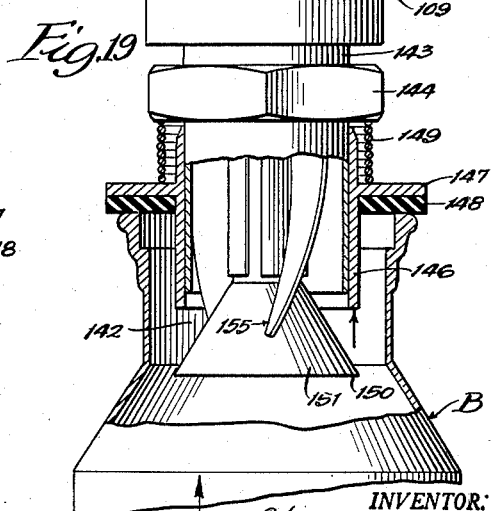
INVENTOR:
Hans Edel,
BY
Dawson Tilton & Graham,
ATTORNEYS.

2,792,680
MILK FILLER APPARATUS

Hans Edel, Arlington Heights, Ill., assignor to Bowman Dairy Company, Chicago, Ill., a corporation of Illinois Application December 10, 1953, Serial No. 397,305

10 Claims. (Cl. 53—281)

This invention relates to apparatus for filling containers with a liquid and, more particularly, to apparatus for automatically discharging a premeasured amount of liquid into suitable containers therefor. The invention is especially useful in the filling of containers with milk and cream but it will be appreciated that it is also useful in connection with other liquids and semi-liquids having sufficient conductivity to operate an electrode as, for example, ice cream mix, etc.

An object of the invention is to provide apparatus for automatically filling containers with a liquid and especially milk and cream containers of relatively large size which may be in the order of 1, 2 and 3 gallon sizes which are frequently ordered by commercial users. Another object of the invention is to provide apparatus for automatically positioning containers under filling heads and for discharging thereinto a premeasured amount of liquid and for thereafter automatically moving the filled containers along a conveyor while simultaneously therewith moving additional containers under the filling heads and premeasuring an additional amount of liquid to be discharged thereinto. Still another object is to provide electric means for premeasuring selected volumes of a liquid to be discharged into suitable receptacles therefor. Yet another object is to provide apparatus of the character described wherein containers adapted to receive a liquid therein are moved in step by step relation along a conveyor and receive liquid at one position thereof, while the containers are thereafter capped at another position or station along the conveyor, with a cap protecting the pouring lip of said containers.

A further object of the invention is to provide stop means of novel construction whereby a pair of containers are moved in tandem fashion in step by step relation under filling heads. Still a further object is to provide adjustable means wherein apparatus as described above can be adjusted quickly and easily to permit selectively the automatic filling of containers of different size. Yet a further object is in providing finger means that enables a reciprocating conveyor apparatus to move containers forwardly in step by step relation while permitting the conveyor means to move in an opposite direction without disturbing the position of the containers thereon. Yet a further object of the invention is to provide vane means whereby a liquid such as milk that has a tendency to foam can be flowed into a container through the open top thereof without first removing air by suction means from the container, and yet the formation of an objectionable amount of foam during the filling of the container does not result. While the above objects will indicate generally the character of the apparatus to be herein disclosed in detail, the enumeration set out is by no means exhaustive and further objects and advantages of the invention will appear as the specification proceeds.

An embodiment of the invention is illustrated in the accompanying drawings, in which—

Figure 1 is a side view in elevation of apparatus embodying my invention and showing the extreme can-discharge position in the operative cycle thereof; Fig. 2 is a broken side view in elevation similar to that of Fig. 1 but showing the extreme can-pickup position; Fig. 3 is a top plan view of a portion of the apparatus taken on the line 3—3 of Fig. 1; Fig. 4 is a transverse sectional view taken on the line 4—4 of Fig. 3; Fig. 5 is a broken perspective view showing a portion of the apparatus and in particular the reciprocating means provided by the conveyor; Fig. 6 is a broken side view in elevation with parts thereof shown in section of the cam mechanism for raising the containers to actuate the filler heads; Fig. 7 is a side elevational view similar to that of Fig. 6 but showing a second position of the cam relative to the cam follower; Fig. 8 is a broken top plan view with portions of the apparatus removed to show more clearly the stop mechanism; Fig. 9 is a broken side view in elevation showing the stop mechanism illustrated in Fig. 8 in lowered position; Fig. 10 is a side view in elevation similar to that of Fig. 9 and showing the stop member when in raised position for intercepting containers as they move along the conveyor; Fig. 11 is a vertical sectional view taken on the line 11—11 of Fig. 10; Fig. 12 is essentially an end elevational view taken on the line 12—12 of Fig. 1; Fig. 13 is a vertical sectional view taken on the line 13—13 of Fig. 12; Fig. 14 is a vertical sectional view taken on the line 14—14 of Fig. 1; Fig. 15 is a perspective view of the vane structure provided in the filler head outlets; Fig. 16 is a vertical sectional view taken on the line 16—16 of Fig. 1; Fig. 17 is a broken side view in elevation showing a container below a filler head; Fig. 18 is a view similar to Fig. 17 but showing the container moved into engagement with the discharge head; and Fig. 19 is a view substantially identical to that of Fig. 18 but with parts thereof broken away and shown in section to illustrate the interior of the discharge valve in the filler head when the container has been moved to its uppermost position to open the valve.

It is believed that it may be helpful, before setting out in detail the apparatus illustrated in the drawings, to first describe generally the construction and function thereof. To this end reference will first be made to Figs. 1 and 2 which show the apparatus in its entirety. Referring then to Figs. 1 and 2, it is seen that a conveyor is provided and which is indicated generally with the letter A. The conveyor A is adapted to receive thereon from any suitable means, such as an infeed conveyor which is not shown and which forms no part of the invention, a plurality of containers designated generally with the letter B. The containers B are advanced by reciprocatory movement of portions of the conveyor in pairs and in step by step relation from the infeed end at the right of the Figs. 1 and 2 showings toward the discharge end of the apparatus which is at the left of the illustration in Figs. 1 and 2. In this movement, the containers B pass under the filler apparatus which is designated generally by the letter C, and the movement of the containers is interrupted at this point for a sufficient length of time to permit a premeasured volume of liquid to be discharged thereinto. Thereafter, the filled containers approach and pass under a capper D where suitable caps or covers are automatically placed over the open top ends of the containers to seal the same. Keeping in mind this general description, details of the structure by which such movements and operations are carried out will now be set forth.

The conveyor mechanism will first be described and particular reference will be made to Figs. 1 through 5 which, it is believed, illustrate the conveyor assembly most advantageously. A plurality of substantially vertical standards 20 are provided in spaced-apart relation and on each side of the apparatus, as is shown best in Figs. 1, 2 and 4. Extending between the aligned standards 20 on opposite sides of the apparatus are the cross bars 21 which are rigidly secured to the standards 20 and which have rigidly secured thereto a pair of spaced-apart rails 22 which provide a support for the containers B and upon which the containers slide during movement thereof from one end to the other end of the apparatus.

The containers B are advanced along the skids or rails 22 in step by step relation and through the reciprocatory movement of the conveyor-advancing means which is designated generally with the numeral 23. This structure includes a pair of spaced-apart L-shaped channel members 24 which ride upon flanged support wheels 25 provided on each side of the apparatus and at spaced intervals throughout the length thereof. The support wheels 25 are rotatably mounted upon the shafts 26 which are rigidly secured within openings provided in the rails 22 and through which the shafts extend. The channels 24 have rigidly secured thereto at spaced points the depending brace members 27 which are rigidly secured at their lower ends to collars 28, each of which is carried upon a shaft 29 that extends transversely across the apparatus. Each of the shafts 29 adjacent the ends thereof provides a rotatable mounting for the flanged wheels 30 which ride between spaced-apart rails 31 which are seen best in Figs. 1 and 2 and Fig. 4.

The rails 31 provide a guide and track means for confining the wheels 30, and it is seen that movement of the shafts 28 longitudinally of the stationary skids 22 carries with it the L-shaped channels 24 which are rigidly secured thereto. The shaft 29 is moved back and forth and such movement is provided by equipping the shaft at its ends with the couplings 32 which are rotatably mounted thereon and have rigidly secured thereto the crank arms 33 that are connected at their opposite ends to a relatively rotatable connector member 34 equipped with a crank arm 35 which in turn is connected to a drive shaft 36. The shaft 36 is rotatably mounted within frame support members 37, as is seen best in Figs. 1 and 2, and is equipped at one end portion with a pair of spaced sprockets 38 that have entrained thereabout drive chains 39 connected by a sprocket 40 to a motor 41. The circuit for energizing the motor 41 is not shown since it is conventional, and it will be apparent to those skilled in the art that such a circuit may be equipped with suitable adjusting means for controlling the speed of the motor and for permitting selection of the operating speed thereof.

It has been before mentioned that I desire to provide means for adjusting the apparatus so that it may handle with equal facility containers of different capacity and which, therefore, will be of different size. This I can accomplish readily by altering the length of movement of the reciprocating apparatus 23. For example, if the containers have a relatively large diameter it will be necessary for the apparatus 23 to move through a greater distance than when the containers are of smaller diameter. Such adjustment is accomplished, reference being made to Fig. 5, by means of a pin and slot arrangement. That is to say, the depending members 27, which are rigidly secured to the L-shaped channels 24, have a transverse support member 42 rigidly secured thereto and which is equipped through the central portion thereof with a tubular portion 43 having a plurality of spaced apertures 44 therein adapted to receive a pin 45 which extends not only through the tube 43 but through a suitable bore provided in the cylindrical shaft 46 which is slidably mounted within the tubular member 43. The shaft 46 is rigidly connected to a plate 47 secured in turn by means of connector blocks 48 to the shaft 29. Thus by aligning the bore within the shaft 46 with the appropriate aperture 44 the desired length of stroke of the member 23 is quickly adjusted.

In order that the reciprocatory movement of the apparatus 23 is operative to advance containers B along the skids 22, it is necessary to provide some physical connection between the apparatus 23 and the containers. Further, such connection must be rigid when the apparatus 23 moves in one direction so that the containers are advanced while being yieldable or releasable when the apparatus moves in the opposite direction so that the position of the containers will not be disturbed. This result is achieved by the provision of the finger structure illustrated best in Fig. 5. Specifically, the structure includes a pin 50 rigidly secured to the L-shaped channel 24 which extends upwardly therefrom. Pivotally mounted upon the upper end of the member 50 is a finger 51 which extends inwardly and over the skids 22. A helical spring 52 received about the pin 50 and which at one end is coupled to the finger 51 and which at its other end projects into one of a plurality of apertures 53 through the channel 24, biases the finger 51 normally against a stop 54. Thus when the apparatus 23 moves in one direction the fingers 51 are held rigid by engagement with the stop member 54 but are free to pivot against the biasing action of the spring 52 when the apparatus is moved in the opposite direction. A number of apertures 53 are provided so that the tension of the spring 52 may be selected as may be required. A nut 55 secures the finger 51 upon the pin 53 and if desired, the springs may be covered by shells 56 although this is optional, and if the shells are not included more ready access is provided to the spring for adjusting the tension thereof. By referring to Figs. 1, 2 and 3, it will be appreciated that a plurality of the finger structures is provided along each of the channels 24 and the structures are aligned in pairs on opposite sides of the conveyor.

As the containers B are advanced along the skids 22 it is necessary to interrupt the movement thereof at the inlet end of the apparatus so that the containers will be moved in tandem pairs under the filling apparatus C. The means I provide for stopping the inward movement of the containers is illustrated best in Figs. 8 through 11, and reference will now be made thereto in particular. The stop apparatus which is designated generally with the numeral 57 includes an arcuate stop plate 58 adapted to extend slightly above the skids 22 for intercepting the containers B, as is illustrated in Fig. 10. The stop plate 58 is rigidly secured by means of an L-shaped bracket 59 to a rectangular receiver member 60 which in turn is rigidly secured to a plunger 61 that extends through a cylinder 62 and is normally biased in an upward direction by the coil spring 63 which seats at one end upon the cylinder closure 64 and at its other end against a flange 65 rigidly carried by the plunger 61.

At its lower end the plunger 61 carries a collar 66 which has projecting therefrom the shaft 67. One end of the shaft 67 slidably receives a U-shaped coupler member 68, as is seen best in Figs. 9 and 10, which in turn is pivotally connected to a bracket 69 through a shaft 70 and pin 71. A crank arm 72 is also connected to the pin 71 and extends downwardly therefrom and is adapted to be engaged by a lug 73 carried by a member 74 which forms a part of the reciprocating apparatus 23. With this construction the stop plate 58 is normally in an upward position held by the force of the coil spring 63, but upon pivotal movement of the crank arm 72 brought about through engagement with the lug 73 the connector member 68 is swung downwardly and carries with it the plunger 61 and stop plate 58.

Since it is desired to advance the containers B in pairs, it is necessary that the stop plate 58 remain inactive while two containers are moved thereover. The plate 58 is therefore locked in the down position by means of a bar 75 provided with a notch 76 adapted to receive therein the shaft 67 and which is pivotally mounted upon the pin 77 which is carried by the bracket 69. The weight of the bar 75 urges it downwardly where it rides upon the shaft 67. When the plunger 61 is moved downwardly the shaft 67 is carried therewith and slips into the notch 76. Thus the stop plate 58 is held in its downward position until the bar 75 is moved mechanically away from the shaft to a point where the notch 76 is free thereof. The bar 75 is kicked free of the shaft 67 when this is desired by movement of the reciprocating member 23 which has rigidly mounted thereon a finger 78 pivotally carried by a block 79. A spring 80 is connected to the block 79 and to the finger 78 and normally biases the finger in the position illustrated in Fig. 8. Thus when the reciprocating apparatus moves to the right in the Fig. 8 illustration, the finger 78 is free to pivot against the biasing force of the spring 80 and to move around the bar 75. On the other hand, when the apparatus travels in the opposite direction, the finger 78 engages the bar 75 and drives it upwardly to free the notch 76 from the shaft 67.

A portion of the reciprocating mechanism is adapted to be moved upwardly to raise containers which are in position below the fillers so that the containers engage dump valves carried by the fillers and during such engagement receive liquid therefrom. This apparatus that moves the containers upwardly is illustrated in detail in Figs. 6 and 7, and reference will now be made thereto. In Fig. 6 it is clear that a portion of the skid members 22 is broken away and is thereby physically separated from the remaining portions of the skids. The broken section which is adapted to be moved upwardly is designated with the numeral 22a. The members 22a are rigidly secured to a support bar 81 which is connected adjacent the center thereof to a plunger 82 slidably mounted within a tube 83 rigidly carried by bracket members 84 which in turn are supported upon cross pieces 85 secured to the frame of the apparatus. At its lower end the plunger 82 has pivotally mounted thereon a bifurcated link 84a rotatably carrying at its lower end a cam follower wheel 86. The plunger 82 has an integral stop 87 that limits pivotal movement of the link 84a in one direction while permitting the link to swing upwardly in an opposite direction. An elongated cam 88 having a trailing end surface 89 that drops off sharply and a leading end surface 90 that rises gradually is rigidly carried by the brace members 91 and 92, and cross brace 92a, and the support structure designated generally with the numeral 93 and to which it is secured; the brace members being rigidly secured to the reciprocating mechanism 23. When the apparatus 23 reciprocates the cam follower 86 is adapted to rise upwardly over the leading cam surface 90 of the cam as the cam moves to the right, which forces the plunger 82 upwardly and with it the rail sections 22a. Fig. 6 shows the apparatus before the follower 86 has been engaged by the cam and the rails 22a are then in their lowermost position. On the other hand, Fig. 7 shows the condition of the rail members 22a when in raised position and when the follower 86 is upon the cam 88. If reference is made to Fig. 2 it is seen that the cam follower wheel 86 rides to the left and completely off of the cam 88 to again lower the containers B and permit their advance along the conveyor. On the return movement, the cam follower wheel 86 and the link 84a are pivoted upwardly so that the rail sections 22a are not raised during the portion of the reciprocatory cycle when the cam 88, carried by apparatus 23, moves to the left.

It has been noted before that adjustment of the apparatus is provided to accommodate containers of different size. If, for example, containers of greater diameter are to be placed under the filler heads, then it is necessary to change the position of the cam 88 relative to the cam follower wheel 86 in order to provide proper timed relation of the mechanism 23 in its travel and the raising and lowering of the container. The adjustment for this is apparent from Fig. 6 which shows that the structure 93 that carries the cam 88 is adapted to adjustably receive a member 94 and to have its relative position with respect thereto determined by a plurality of apertures 95 and pin 96 that may extend selectively through one of the apertures 95 and through a bore within the member 94.

It should be noted that while the length of stroke of the reciprocating apparatus 23 is increased when containers of larger diameter are being received, and this necessitates movement of the tubular member 43 (shown in Fig. 5) to the right relative to the shaft 46, the cam 88 is moved in an opposite direction and therefore to the left relative to the member 94 in the Fig. 6 illustration.

The filler head structure is indicated generally in Fig. 12 and reference will now be made thereto in describing this portion of the apparatus. The filler structure is designated generally with the numeral 100 and includes a container 101 that provides a reservoir for the liquid and which has an inlet 102 equipped with a float valve 103. Thus the liquid within the reservoir 101 is maintained at substantially a constant level so that a relatively constant pressure head is provided at the outlet 104 thereof and throughout the outlet conduit 105 that depends therefrom. Preferably, a valve 106 is interposed in the conduit 105 and provides control of the volume of liquid flowing through the conduit. At its lower end the conduit 105 is equipped with a T fitting 107, one end of which is connected by an elbow 108 which at its other end is coupled to a measuring cylinder 109. The opposite end of the T 107 is similarly connected to an elbow, not shown, which provides communication with a second measuring cylinder 110, not shown in Fig. 12 but which appears in Fig. 1. At the right of T 107 is a drain valve 110a to enable draining the tank 101 of any surplus material; mainly used when switching from one product to another.

The reservoir 101 is supported upon a vertical column 111 which is bolted at its upper end to a pedestal 112 that is rigidly secured to the bottom wall of reservoir 101. The column 111 is received within a tubular member 113 and at its lower end the column is equipped with a depending shaft portion 114 that is threaded throughout its length. Threadedly receiving the end portion 114 is a rotatable nut 115 which is elongated and is equipped intermediate the ends thereof with a hand wheel 116 to facilitate rotation thereof. A bearing 117 provides a rotatable mounting for the elongated nut 115 and is supported within a collar 118 rigidly secured to the stationary frame members of the apparatus through the connector support 119. A guide collar structure 120 rotatably receives the upper end portion of the threaded shaft 114 therein and adds stability to the structure. Thus rotation of hand wheel 116 will raise and lower selectively the reservoir 101 and the measuring cylinders 109 and 110 which are carried thereby. This adjustment permits containers having different elevations to be accommodated by the apparatus.

As has been noted, two measuring chambers 109 and 110 are provided and each is adapted to receive thereunder one of the pair of containers that are filled simultaneously. Both of the measuring cylinders are identical in construction and therefore only one will be described, and it should be understood that the description applies equally to both.

Each of the measuring cylinders is tubular and is elongated, and is equipped with a plurality of swing clamps 121 that are adapted to clamp a removable bottom closure 122 to the open bottom thereof. If reference is made to Fig. 14 it will be seen that an O-ring 123 may be interposed between a flange 124 carried by the measuring chamber and the bottom closure 122. The swing clamps 121 have a threaded nut and bolt assembly 125 which permits the bottom closure member 122 to be drawn tightly against the O-ring 123. The bottom closure member 122 is equipped with a depending annular collar 126 that receives the end of the elbow 108 and provides an inlet for the measuring chamber. The inlet opening is controlled by a valve 127 having a tapered end portion equipped with an O-ring 128 adapted to sealingly engage the tapered inner surface of the inlet opening. The tapered end portion 129 of the valve and the depending fins 130 guide the valve member into position within the inlet opening to provide a seal therewith. Preferably, the valve 127 and associated structure is relatively heavy so that it provides a sealed closure for the measuring cylinder inlet against the pressure head provided by the liquid within the reservoir 101 and within the outlet tube 105.

As is seen best in Fig. 12, the valve 127 is equipped with an elongated valve stem 131 that extends upwardly and completely through the cylinder or measuring chamber 109 and onwardly and upwardly and completely through the reservoir 101. The stem 131 is protected from the fluid within the reservoir 101 by a tube 132 that encloses the same and is welded or otherwise sealingly secured to the bottom of the reservoir 101. As is most clearly seen in Fig. 14, the upper end of the stem 131 is bifurcated at 133 and receives between the spaced fingers thereof a connector rod 134 which is secured therein by means of a pin 135. The connector 134 in turn is secured by an elongated stub shaft 136 to the plunger 137 of a solenoid 138. The solenoid is supported by means of collar 139 and bolt assembly 140 which extends through the walls of a casing 141 which encloses the solenoid. Thus it is seen that the valve 127 is a solenoid-controlled valve and normally closes the inlet opening into the measuring cylinder 109, but which is raised upwardly to permit fluid to flow into the measuring chamber when the solenoid 138 is actuated. The circuit for actuating the solenoid will be described hereinafter. Since solenoid structures of the character used herein are well known in the art, a further description of the construction and operation thereof will not be set out.

Each of the measuring cylinders is equipped with an outlet, as is indicated in Fig. 14, and which has assigned thereto the numeral 142. The outlet 142 is in part provided by a depending collar 143 that has a threaded end adapted to receive thereon a coupling member 144 carried by a tube 145. The tube 145 in turn slidably receives thereon adjacent the lower end portion thereof a slidable sleeve 146 equipped with an annular flange 147 that may have secured to the bottom surface thereof a resilient bumper member 148. A spring 149 seats at one end upon the annular flange 147 and at its opposite end upon the connector member 144 and is operative to bias the sleeve 146 in a downward direction where it seats upon a frustoconical-shaped valve 150. The valve 150 has a hollow interior 151 and has rigidly secured thereto an upwardly-extending conduit 152 which, as is seen in Fig. 12, enters the interior of the measuring cylinder 109 and extends substantially to the upper portion thereof. The hollow interior 151 and conduit 152 provide an escape for air within a container being filled and preferably at least the upper end of the conduit 152 is equipped with a plurality of spaced apertures to permit ready escape of air that may be received therein.

When a container is moved under the sleeve 146 and annular flange 147 thereof and pushes these members upwardly against the force of the spring 149, as is illustrated in Fig. 19, an opening is provided between the valve 150 and end of the sleeve 146 which provides a valve seat. Thus liquid within the measuring cylinder 109 may flow downwardly through the outlet 142, through the tube 145 and into a container positioned therebelow through the space between the valve 150 and sleeve 146.

As is well known, milk has a tendency to foam considerably when it is discharged into the air or into a container having air therein. This creates a serious problem in that it necessitates a much longer time for filling a container without considerable wastage of milk in the filling operation. I have discovered that by providing novel vanes within the tube 145 and sleeve 146 that foaming of the milk being dispensed or discharged into the containers can be minimized considerably. The vane structure I provide is illustrated in Fig. 15 in perspective, and reference will now be made to this figure. The vane structure is assigned the numeral 155. The structure includes an elongated tube 156 that is adapted to slidably receive the conduit 152, as is shown in Fig. 14. A plurality of vanes extend laterally and outwardly from the tube 156 and are numbered 157. Each of the vanes 157, there being three in number, extend downwardly and are somewhat longer than the tube 156 and at their lower end portions are curved laterally and terminate in a point. Thus liquid flowing over these vanes is given a swirling motion and this motion, I have found, decreases the tendency of the milk to foam. In order to secure the vane structure 155 in position upon the conduit 152 the tube 156 is provided with an L-shaped slot 158 that is adapted to receive and pass therethrough a pin 159 carried by the conduit 152. Thus the vane structure may be slipped into position over the conduit 152 and locked in position by engagement of the pin 159 with the L-shaped slot 158. This construction also permits ready assembly and disassembly of the apparatus for frequent cleaning.

It has been stated before that the measuring cylinders 109 discharge into containers received thereunder a premeasured volume of liquid. The premeasuring of the liquid in my apparatus is accomplished automatically by electric means. A portion of the means has already been described and takes the form of the valve 127 and associated solenoid 138 which together control the inlet into the measuring container 109. The remainder of the structure is seen best in Fig. 16 and includes the electric circuit means for actuating the solenoid at appropriate times and for selected lengths of time to permit the desired volume of liquid to flow through the inlet opening and into the cylinder 109.

Specifically, an elongated rod 160, which receives at its upper end an insulating member 161 and also receives a washer 162 abutted by nuts 163 and 163a threadedly received on the upper end of the rod, depends downwardly and into the cylinder 109. Preferably, a tight frictional engagement between the rod 160, which is an electrode, and the insulator member 161 is provided and the electrode 160 may be equipped with a stop 164 that permits all of these members to be rigidly united by tightening of the nut 163. An electric lead may be clamped between the nuts. A coupling nut 165 carried by the insulator 161 is threadedly connected to a threaded portion 166 with which an elongated tube 167 is equipped that receives the electrode 160 therein and which is held in spaced relation therewith by an insulating spider 168.

The tube 167 slidably receives a nut 169 which is equipped with a set screw 170 that permits a rigid connection between the nut and tube. The nut 169 is threaded onto a rigid sleeve member 171 which is welded to the upper wall 172 of the reservoir 101, extends through the reservoir, and at its lower end is welded to the bottom wall 173 of the reservoir. Thus liquid within the reservoir is prevented from contacting the electrode 160. At the same time, the inner tubular shield member 167 extends downwardly through the sleeve 171 and into the measuring chamber 109. The shield member protects the electrode and prevents the rapid inrush of liquid into the measuring cylinder from prematurely actuating the electric circuit of which the electrode forms a part. Preferably, the member 167 is provided with a plurality of apertures 174 so that the escape of air from within the shield is permitted.

The releasable nut 169 permits the entire electrode structure to be raised and lowered through the reservoir 101 and within the measuring cylinder 109. Thus the volume of liquid that is measured by the electrode can be varied if desired. If, for example, the electrode structure is raised a greater volume of liquid must be received within the measuring cylinder 109 before the liquid engages the electrode, and provides electrical contact therewith. On the other hand, if the electrode structure is lowered until it approaches the bottom wall 122 of the measuring cylinder, a much smaller volume of liquid will be required before engagement of the electrode results. A shield or guard 175 is provided to cover the nut 167 and, partially, the set screw 170 therefor and serves to collect condensate and drain it away from the nut, etc.

If reference is made to Figs. 6 and 7 it will be seen that a switch 180 is provided and that this switch is mounted so as to be actuated by the portion 22a of the track 22 as it is raised and lowered during the filling operations. The switch 180 is normally closed when the section 22a of the track is in lowered position and this switch is in circuit with the solenoid 138, and also in series with the electrode 160. Thus in order that the solenoid 138 be actuated, the switch 180 must be closed. The purpose of the switch 180 is to prevent the entrance of liquid into the measuring cylinders while a container is being filled.

*Operation*

In operation of the apparatus containers B are placed upon the track 22 by any suitable means such as an infeed conveyor that is not shown. The containers are arranged one behind the other and are advanced into engagement with the stop member 57 which limits forward movement of the containers in the event that they are positively fed onto the track 22.

When the main switches are thrown to energize the motor 41 the mechanism 23 is driven in a reciprocatory movement through the crank arms 33 and 35 which have been described. Assuming that the apparatus is in the position illustrated in Fig. 1, the initial movement of the reciprocating mechanism 23 will be in a rearward direction. The cam follower 28 will be held rigid by the stop 87 and it will ride up upon the cam 88 causing the section 22a of the track to raise, bringing any containers supported thereon into engagement with the dump valves of the measuring cylinders 109 and 110. As part of this rearward movement of the reciprocating mechanism 23, the depending member 72 of the stop structure 57 will be pivoted upwardly, through engagement with the post or lug 73, to move the stop plate 58 downwardly and into a position where the bar 75 locks the plate in the down position so that the containers B may advance thereover along the track 22. At the end of the rearward stroke of mechanism 23, two of the containers are each engaged by a pair of the fingers 51 in preparation to move them forwardly along the track on the return stroke of the mechanism 23. At this instant the apparatus is in the position shown in Fig. 2 with the cam follower 86 off of the cam 88 and the track section 22a thereby lowered.

At this moment, the direction of reciprocation of the mechanism 23 is reversed by the eccentric crank structure motivated by the motor 41 and it starts to move forwardly, whereby the fingers 51 grip the containers and move them one step in the forward direction and into position under the respective measuring cylinders 109 and 110. After two containers have moved over stop plate 58, arm 78 pushes bar 75 outwardly whereby the slot 76 is disengaged from the transverse shaft 67 and the stop plate 58 moves upwardly to prevent forward movement of the following containers along the track 22. Also at the same time, the cam follower 68 pivots upwardly and the cam 88 glides thereunder without raising the track section 22a. It will be appreciated that as the mechanism 23 moves forwardly, the fingers 51 all along the length of the apparatus engage containers upon the track 22 and advance them one step (equal to the center to center spacing between alternate containers) along the track. Thus, one complete cycle is completed.

As has been already indicated, when the reciprocating mechanism 23 moves from left to right in Figs. 1 and 2 and the track section 22a is raised into the position shown in Fig. 7, the containers supported thereon are lifted into engagement with the flange 147 carried by the dump valve assembly of each of the measuring cylinders 109 and 110. As can be seen best in Figs. 14 and 19, when the flange 147 is raised against the biasing action of the coil spring 149, the dump valve is opened and the volume of liquid within the measuring chambers flows therefrom and into the containers positioned therebelow.

A certain time interval is needed to permit the liquid from within the measuring chamber to flow into the containers and this time is determined by the length of the cam and the length of time required for the cam 88 to traverse the distance from one end to the other thereof while under and engaging the cam follower 86 to lift the track section 22a. While the cam length is predetermined, the time interval may be altered by selectively increasing or decreasing the traversing time of the mechanism 23 through regulation of the speed of the motor 41. It should be noted that during the interval wherein the mechanism 23 is moved in a rearward direction, the containers remain stationary upon the track 22, for the fingers 51 are pivotally mounted and are permitted to swing laterally during such return movement whereby they move around the containers. The containers are moved then in step by step relation along the track 22 and finally are positioned under the capper D whereby a structure similar to the cam and cam follower arrangement heretofore described is operative to raise a section of the track to lift the containers into engagement with the capper, with the result that a cap is placed over the open tops of each of the containers. This capper structure is illustrated in Figs. 1 and 2 and since it has not been heretofore described in detail, a brief summary may be set out here.

In this structure a cam 190 is provided and it functions in cooperation with a cam follower 191 carried by a plunger 192 that supports thereon the section of the track that is raised and lowered. The cam 190 is reciprocated with the mechanism 23 and in one direction of movement it causes the cam follower and plunger to move upwardly, while when moving in the return direction the cam follower 191 is pivoted upwardly and rides over the cam 190 without moving the plunger 192. The actual capping mechanism is adjustably supported upon a vertical shaft 193 that is preferably threaded and threadedly receives a sleeve 194. Rotation of a crank 195 is operative to raise and lower the sleeve 194 and capper support members 196 relative to the track 22 so that cans of various heights may be accommodated. The cappers which engage the open ends of the containers are indicated generally by the numeral 197, and since such structures are old and known in the art a detailed description thereof will not be set out.

A premeasured volume of liquid is discharged from the measuring cylinders 109 and 110 when containers are received thereunder and trip the dump valve carried at the lower end of the chambers. The premeasuring is accomplished in the following manner. The reservoir 101 is normally full of liquid to an elevation determined by the float-controlled valve assembly 103. The depending conduits 105 from the reservoir 101 lead to the bottom ends of the measuring cylinders 109 and 110 and the liquid within the reservoir 101 flows downwardly through these conduits and is ever present at the lower ends of the cylinders 109 and 110. The valves 127 prevent entry of liquid into the cylinders 109 and 110 until such time as the valves are raised to open the inlets to the cylinders. Power is supplied to the solenoid 138 through a relay controlled by the electrode 160 and switch 180 in series therewith. When liquid is in the cylinders and is at an elevation so that contact is made with the electrode 160, the control relay is open and the solenoid circuit is broken, permitting the valve 127 to close, which prevents the entry of liquid from the reservoir into the cylinders. On the other hand, when the liquid within the cylinders is at an elevation slightly below the electrode 160 so that contact therewith is not established, the control relay is closed and the solenoid circuit is completed (assuming switch 180 to be closed) and the valve 127 is lifted from closing position with the cylinder inlet, and liquid may flow thereinto. Liquid will continue to flow into the cylinders until contact is made with the electrode 160 which will again open the solenoid to close the valve 127.

As has been stated before, the switch 180 is in the nature of a limit switch and is in series with the solenoid circuit. Therefore, when the track section 22a is raised and the containers are in position under the cylinders 109 and 110 and are receiving liquid therefrom, the solenoid cannot be actuated and the valve 127 will remain closed. On the other hand, the moment that the track section 22a is lowered to actuate the switch 180, the solenoid circuit is conditioned so that the valve 127 is open to permit liquid to flow into the measuring chamber.

The vane structure shown best in Figs. 14 and 15, and which forms a part of the dump valve assembly, functions to minimize the formation of foam when a liquid such as milk is discharged from the measuring cylinders and into containers therebelow. The curvature of the vanes is such that a slight swirling motion is given to the milk and it is caused to flow evenly and smoothly into the containers with minimum turbulence, whereby air is excluded to a considerable extent and frothing and foaming limited in this manner. It will be noted that the vane structure is removably mounted upon the conduit 152 which permits air to flow out of the containers during the filling operation. The slot and key mounting device shown and heretofore described provides ready means to separate the dump valve structure for cleaning, etc., which must be done frequently where milk is being handled.

The depending sleeve 167 which surrounds the electrode 160 within the measuring cylinders functions to protect the electrode against the inward rush of liquid into the chambers when the control valve 127 is opened. The sleeve causes the liquid to rise slowly therein and gradually into contact with the electrode even though considerable turbulence may be present within the measuring chambers on the outside of the sleeve. This structure is advantageous in preventing premature energizing and deenergizing of the solenoid circuit which would be caused by the splashing of liquid about the electrode.

Preferably the electrode is formed of stainless steel and, if desired, may be provided with a carbon tip. Preferably, the remaining portions of the filler structure that can be conveniently made from stainless steel should be so formed, for it is easy to clean and has been found to provide excellent results in the apparatus described.

Each of the electrodes 160 is adjustably mounted and the position thereof within the respective measuring chambers 109 and 110 may be changed as required to accommodate the automatic filling with a premeasured volume of liquid of containers of different size. Thus if a larger container is to be accommodated, the electrode 160 in each of the measuring chambers is raised to a higher elevation whereby a greater volume of liquid is admitted to the measuring chamber before the control valve 127 is closed. The electrode may be lowered to accommodate the opposite condition wherein a smaller volume of liquid is required. Similarly, the entire apparatus may be adjusted to accommodate containers of either different diameters, different heights, or both. If the height of the containers is changed, the filler apparatus C and the capper apparatus D are either raised or lowered, as has been heretofore described. Further, if the diameters of the containers to be accommodated by the apparatus are changed, the slot and pin arrangement is selectively adjusted, as has been brought out before, to provide greater or lesser stroke length for the reciprocating apparatus 23 and to, at the same time, alter the stroke of the cam 88 for the filler and cam 190 for the capper.

While in the foregoing specification an embodiment of the invention has been set out in considerable detail for purposes of illustration, it will be apparent to those skilled in the art that considerable deviation in these details may be made without departing from the spirit and principles of the invention.

I claim:

1. In milk filler apparatus, a measuring cylinder equipped with an inlet, means for supplying liquid to said inlet, a valve adapted to control said inlet and being equipped with a stem, a solenoid having a plunger connected to said stem and being operative to control the position of said valve, an electrode extending into said cylinder and being adapted to contact liquid admitted thereinto for completing a circuit therethrough, circuit means for said solenoid and including said electrode whereby actuation of said solenoid is dependent upon the elevation of the liquid received within said cylinder, and a hollow shield within said measuring cylinder and enclosing said electrode to prevent premature contact therewith by liquid rushing into said measuring cylinder.

2. In milk filler apparatus, a reservoir adapted to receive milk therein, a measuring cylinder equipped at the lower end thereof with an inlet opening, conduit means providing communication between said reservoir and said inlet, a solenoid, a valve adapted to control said opening and being in operative arrangement with said solenoid, an electrode in circuit with said solenoid and extending into said cylinder and adapted to contact liquid received therein, a discharge valve controlling an outlet opening provided by said cylinder for controlling the flow of liquid therefrom, and a hollow shield within said measuring cylinder and enclosing said electrode to prevent premature contact therewith by liquid rushing into said measuring cylinder.

3. In filler apparatus for filling receptacles with a liquid, a container providing a measuring chamber and having an inlet adapted to be connected to a source of liquid, electrically-operated valve means controlling said inlet, said container having also a valve-equipped outlet, and means for admitting a predetermined volume of liquid into said measuring chamber through said inlet comprising an electrode mounted within said measuring chamber and a circuit therefor including said electrically-operated valve means, said circuit being arranged so that said valve means is closed when a predetermined volume of liquid is received within said chamber, and a hollow shield within said chamber and surrounding said electrode to prevent contact therewith by liquid splashing as it enters said chamber through said inlet.

4. The apparatus of claim 3 in which said electrode is mounted for axial adjustment within said chamber, whereby the position of said electrode may be changed to vary the predetermined volume of liquid admitted into said chamber.

5. The structure of claim 3 in which said electrically-operated valve means includes a solenoid and a valve, said solenoid being operatively arranged with said valve.

6. In filler apparatus for discharging a predetermined volume of liquid into a receptacle, a container providing a measuring chamber therein and having an inlet adjacent the lower end thereof adapted to be connected to a source of liquid under pressure, a valve for said inlet, a solenoid operatively arranged with said valve and adapted when energized to open said valve and permit the flow of liquid into said chamber, said container having also an outlet, dump valve means arranged with said outlet and adapted when opened to discharge the contents of said chamber into a receptacle, an elongated electrode adjustably supported in said chamber for ultimate contact with a liquid entering thereinto, the axial position thereof determining through control of said solenoid the volume of liquid admitted to said chamber through said inlet, circuit means for said solenoid and including said electrode, said circuit means being adapted to deenergize said solenoid when the liquid within said chamber rises to the elevation of said electrode, and a hollow shield within said chamber and surrounding said electrode to prevent contact therewith by liquid splashing as it enters said chamber through said inlet.

7. In combination, an elongated conveyor providing a pair of spaced-apart rails adapted to have containers slide thereover, reciprocable mechanism provided by said conveyor for longitudinal movement along said rails and being operative in its reciprocatory movement to advance containers, and a filler mounted above said rails and in spaced relation therewith and being adapted to discharge liquid into a container when the container is under said filler and is raised into engagement therewith, said conveyor providing vertically-movable support members below said filler, a cam follower arranged with said support members, a cam carried by said reciprocable mechanism and being adapted to engage said cam follower during the reciprocation thereof whereby said cam follower and said support members arranged therewith are raised when said cam moves in one direction relative thereto, said cam and cam follower being operative to afford movement of the cam in the other direction without raising said support members.

8. The combination of claim 7 in which a capper is provided in spaced relation with said filler, said capper being mounted above and in spaced relation with said rails, said conveyor providing second support members below said capper, a cam follower arranged with said second support member, a cam carried by said reciprocable mechanism and being adapted to reciprocate relative to the cam follower arranged with said second support member and to raise the same when it moves in one direction relative thereto, said second mentioned cam and cam follower being operative to afford movement of that cam in the other direction without raising said second support member.

9. In milk filler apparatus wherein milk is discharged from a container into a receptacle therebelow, a vane structure mounted in the outlet of said container and being equipped with a plurality of elongated vanes extending in the direction of flow of the milk from said container and into said receptacle, the lower end portions of each of said vanes being turned laterally and downwardly to provide a swirling motion to the milk during flow thereover.

10. Milk filler apparatus, comprising a pair of elongated rails adapted to receive and support containers thereon, reciprocating mechanism mounted for longitudinal movement along said rails, pivotally-mounted fingers carried by said mechanism and extending over said rails and being adapted to engage containers supported thereon to advance the same during movement of said mechanism in one direction of its reciprocatory cycle while permitting free movement of said mechanism while the containers remain stationary during the opposite direction of movement of the reciprocatory cycle, a stop member carried at the entrance end of said rails and being normally held thereabove whereby the forward movement of containers along said rails is prevented, means arranged with said stop member and said reciprocating mechanism for lowering said stop member during the movement of said mechanism in one direction, a filler mounted above said rails, a capper mounted above said rails in spaced relation with said filler, vertically-movable support members provided beneath said filler and beneath said capper and being adapted to be raised to lift containers into engagement respectively with said filler and said capper, means arranged with said reciprocating mechanism and with said support members for raising the support members during movement of said mechanism in one direction and including a cam and cam follower, and means provided by said filler for discharging a predetermined volume of liquid into containers when the same are raised into engagement therewith.

References Cited in the file of this patent
UNITED STATES PATENTS

| Number | Name | Date |
|---|---|---|
| 1,227,244 | Buhles | May 22, 1917 |
| 1,284,310 | Gilbert | Nov. 12, 1918 |
| 1,455,742 | Bates | May 15, 1923 |
| 1,686,129 | Fullips | Oct. 2, 1928 |
| 1,779,683 | Strandt et al. | Oct. 28, 1930 |
| 1,925,120 | Tamminga | Sept. 5, 1933 |
| 2,029,299 | Anderson | Feb. 4, 1936 |
| 2,081,650 | Tamminga et al. | May 25, 1937 |
| 2,319,075 | McKinnis | May 11, 1943 |
| 2,397,512 | Schwartz et al. | Apr. 2, 1946 |
| 2,525,295 | Harrington | Oct. 10, 1950 |
| 2,583,106 | Kayat | Jan. 22, 1952 |
| 2,663,482 | Gilberty | Dec. 22, 1953 |
| 2,666,565 | Barnes et al. | Jan. 19, 1954 |